May 23, 1939.  R. C. DARNELL  2,159,551
AIR CLEANER
Filed Jan. 26, 1938
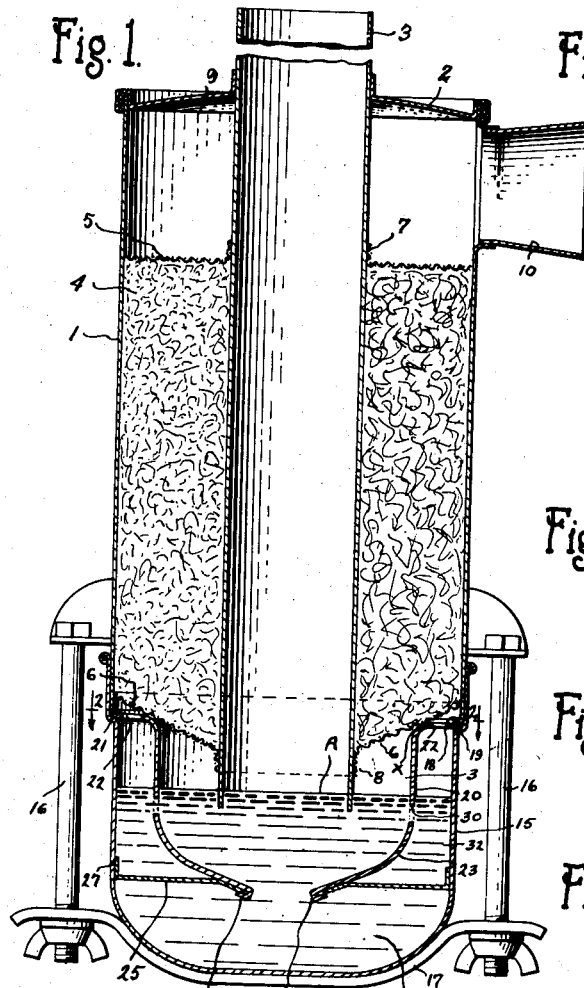
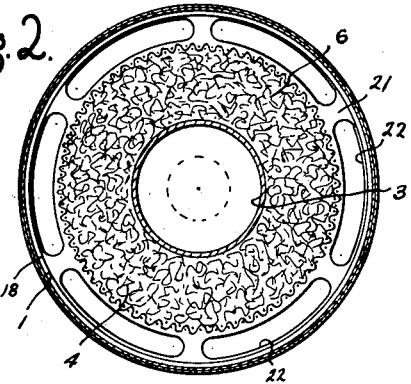
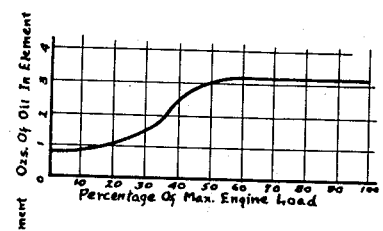
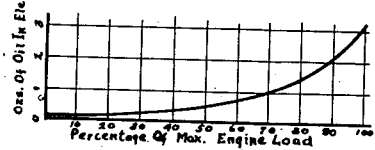
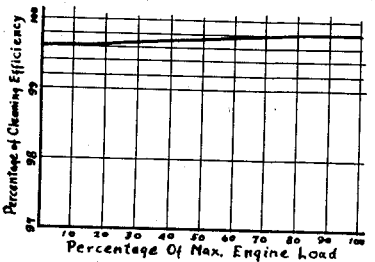
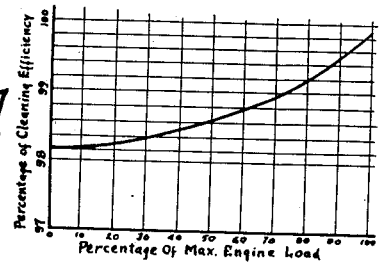
INVENTOR.
Rex C. Darnell
BY
ATTORNEY.S Patented May 23, 1939

2,159,551

UNITED STATES PATENT OFFICE 2,159,551

AIR CLEANER

Rex C. Darnell, Detroit, Mich., assignor, by mesne assignments, to King-Seeley Corporation, Ann Arbor, Mich., a corporation of Michigan

REISSUED

SEP 17 1940

Application January 26, 1938, Serial No. 186,970

7 Claims. (Cl. 183—15)

This invention relates to air cleaners, and has to do particularly with an air cleaner for use with engines of the internal combustion type.

The invention is directed particularly to the provision of an air cleaner for use with engines used in tractors, trucks, or in other installations, either stationary or mobile, although, of course, the invention may be employed with passenger vehicles.
Among the objects of the invention is the provision of an air cleaner of the oil bath type and which involves improvements, by means of which a high cleaning efficiency is obtained, while the physical dimensions of the cleaner are minimized and at the same time a high factor of safety is obtained against pulling the oil therein over into the engine. Further, the invention aims to provide a filter wherein the filtering element is self-cleaning and the dirt is caught and confined in a body of oil, in connection with which adequate provision is made in a primary oil volume for retaining the accumulated dirt. In this connection the quantity of oil used in the cleaner is separated in what may be termed primary and secondary portions or bodies, to the end that a body of oil wherein the dirt and other extraneous matter is collected is more or less quiescent during engine operation, and the accumulated material is not agitated or caused to move again into the filtering element. Still further, it is the aim of the invention to provide an air filter wherein a broad range of oil levels may be used without materially interfering with the function and efficiency of the cleaner.
In the accompanying drawing one construction is shown for carrying out the invention, and also some charts are illustrated to demonstrate the function and efficiency of the cleaner.

Fig. 1 is a vertical section taken through a cleaner constructed in accordance with the invention.

Fig. 2 is a sectional view taken substantially on line 2—2 of Fig. 1.

Fig. 3 is a partial sectional view similar to Fig. 1 but showing a condition of operation.

Fig. 4 shows a curve illustrating a quantity of oil retained in the filtering element at various engine loads.

Fig. 5 is a similar chart showing the curve of a cleaner of a type heretofore known.

Fig. 6 shows an efficiency curve of the cleaner of this invention.

Fig. 7 illustrates an efficiency curve of a cleaner of the type having the saturation curve shown in Fig. 5.

The cleaner may advantageously take the form of a cylindrically shaped body disposed on a vertical axis. It has an exterior shell 1 with a top closure 2. An air inlet tube 3 extends through the closure 2 and terminates below a filtering element 4 which is disposed within the shell 1 and around the inlet tube 3. The filtering element may be confined in its upper end by a foraminated element 5 which may be of screen construction or sheet metal formation with apertures therein. At the lower end the filtering element is defined and supported by a foraminous element 6 which likewise may be of screen construction or apertured sheet metal construction, and the elements 5 and 6 may be flanged and secured to the tube 3 as at 7 and 8. The upper portion of the element terminates below the closure 2 to provide a chamber 9, from which leads an outlet or conduit 10 which may be connected with the inlet manifold or carburetor of the engine. The member 6 preferably is shaped to give the lower end of the filtering element a frusto-conical shape with the lower portion thereof surrounding the tube 3 extending downwardly toward the oil sump, as will presently be described.

An oil receptacle or sump 15 may be telescoped over the lower end of the shell and may be held in position by bolts 16 and a strap or support 17 underlying the sump. The lower edge of the shell may be provided with a flange 18 while the receptacle 15 may be equipped with a shoulder 19. An oil cup 20 may be disposed within the receptacle 15 and it may be fashioned from sheet metal with an outwardly extending flange at its upper end which lies upon the shoulder 19 and is clamped in position between the shoulder 19 and the flange 18. The flange on the oil cup is illustrated at 21 and it is cut out to provide apertures 22. The circumferential wall of the cup 20 in the upper regions may be substantially cylindrical, as shown, while the lower portion is downwardly and inwardly inclined as at 23, and the cup terminates in a central opening 24. An element which may be termed a mask plate or partition is illustrated at 25. This may be an imperforate sheet metal plate secured to the oil cup as by means of fashioning the metal around the opening 24 over the edges of the mask plate as illustrated at 26, and the mask plate may have a peripheral flange 27 arranged for a nice sliding fit within the receptacle 15.

The oil cup is provided with a series of oil flow apertures 30 located preferably above the inclined bottom walls 23 and below the normal liquid level which is illustrated at A.

The cup 20 defines an air passageway 31 which is circumferential in form around the lower end of the tube 3, and it divides the receptacle in that the cup forms the passageway 31 on the inside and a chamber 32 on the outside thereof. The bottom of the chamber 32 is defined by the mask plate 25, and below the mask plate is a chamber 33 for containing a body of the cleaning oil. The volume of oil above the mask plate, including that oil within the cup when the cleaner is in a static condition, and in the chamber 32, may be termed the secondary volume or body of oil, whereas the oil in the chamber 33 may be termed the primary body of oil.

In general, the operation is as follows: As the engine creates a partial vacuum in the connection 10, air from the outside is caused to flow in through the tube 3, thence into the cup 20 as illustrated by the arrows in Fig. 3, thence upwardly into the filtering medium 4. The chamber 32 is out of the air flow, and therefore the portion of the filtering medium overlying this chamber is more or less in what may be called a quiescent zone. The upper edge of the cup 20 preferably comes into close proximity or in contact with the element 6 at about the point X, although a working clearance may be provided at this point. The oil which is carried from the cup upwardly into the filter may flow or migrate to the outer zone of the filtering medium over the chamber 32 and more or less out of the air stream, and therefore may flow by gravity back down into the compartment 32 through the apertures 22. This builds up a head of oil in the compartment 32 so that oil is caused to flow back into the cup through the holes 30 where this oil is picked up by the air stream and again lifted into the filtering medium. In much of the engine operation the bottom of the cup 32 may be substantially devoid of oil, and the air moving downwardly from the tube 3 may strike the surface of the body of oil in the chamber 33 at the location of the aperture 24. This is the general operation, and specific points follow.

It will be noted that the air stream makes an abrupt reversal of direction within the cup 20. Many of the larger bodies of dirt and extraneous matter will be deposited on the oily surfaces of the inclined bottom of the cup while some of the larger particles will have a direct impact with the surface of the oil at the opening 24 and will be retained. The larger particles striking the inclined surfaces will gravitate down the surfaces and fall into the primary body of oil. Most of the dirt will be separated from the air in this manner, particularly the larger particles. The body of oil in the chamber 33 is substantially quiescent in that it is not in an air flow stream and therefore a large quantity of dirt may be retained in the compartment 32 and will in no way interfere with the circulation of the secondary oil, which circulation is from the cup into the filtering medium back into the chamber 32 and thence back into the cup through the apertures 30.

The remaining particles follow the air stream and move up into the filtering medium, but the oil which is picked up by the air wets these particles and retains them. This oil then flows back into the chamber 32, as above described, and the dirt and particles carried therewith may settle at the bottom of the chamber 32 which is on the mask plate 25. Therefore, it will be seen that the accumulated dirt is outside of the cup, and even though a large quantity is accumulated in the chamber 32 or chamber 33, the oil in the cup may be substantially free of any such accumulation. Therefore, the flow of air through the cleaner is not restricted by accumulated dirt. The filtering element is self-cleaning in that oil moves in a circuitous path into and out of the element. In other words, assuming a condition where there is a constant flow of air through the cleaner, the secondary volume of oil moves in a circuitous path constantly removing the dirt from the filtering medium.

The use of the mask plate permits of locating the bottom of the cup 20, and therefore opening 24, in relative close proximity to the inlet tube. This factor, therefore, contributes to the minimizing of the physical dimensions of the cleaner. In other words, the cleaner can be made shorter. This is an important item since, as a rule, a cleaner has to be installed in any available space in or around the engine.

The efficiency of an oil bath cleaner depends very largely upon the amount of oil retained in the filtering medium. Of course, whatever oil enters the filtering medium has been carried into the same by the air passing through the filter. Heretofore at relatively low engine loads the amount of oil in the filtering medium was relatively low and the oil in the filtering medium did not approach its maximum volume until the engine was operating at maximum load. The result was low efficiency at low engine loads. With the arrangement of this invention substantially all of the oil in the cup 20 is lifted into the filtering medium at relatively low engine speeds, and likewise at relatively low engine loads. As the speed of the engine or load increases, however, the volume of oil in the filtering medium does not substantially increase, and therefore there is little likelihood of pulling the oil completely through the filter and over into the engine. Therefore, the invention makes it feasible to shorten the over-all dimensions of the filtering medium, and this contributes to minimizing the physical dimensions of the filter.

Fig. 4 shows a curve found by test of a filter constructed in accordance with this invention, showing the oil in the filtering medium at various engine loads. At zero load, or in other words with the engine idling and not under load, there was almost an ounce of oil in the filtering medium. At about 50% engine load three ounces of oil was in the medium, and from 50% of engine load to 100% of engine load the increase was very slight with the obvious indication that the filtering medium was substantially saturated at all loads above 50% of maximum engine load. The cup 20 is substantially devoid of oil at this time. Note particularly the abrupt rise in the curve from about 20% of engine load to 45% of engine load. By way of comparison the curve shown in Fig. 5 may be considered. The same capacity filter was used in a test to determine the curve shown in Fig. 5, but the mask plate was not used and, therefore, the oil was not divided into primary and secondary bodies. At zero engine load there was only a small fraction of an ounce of oil in the medium, and even at 70% of maximum engine load the oil in the medium had only reached one ounce. From 70% to 100% engine load, however, the curve rises relatively abruptly to something over three ounces.

This means that the cleaning efficiency of a cleaner using the mask plate is much higher at all speeds under maximum engine load than a filter using no mask plate. The efficiency curve of the present filter is shown in Fig. 6, and it will be noted that even at zero engine load the efficiency was 99.6%, rising substantially to 99.8 at about 80% of engine load. The efficiency curve of the filter which was used in the ascertaining of the saturation curve shown in Fig. 5 was 98.2 at zero engine load and the efficiency curve more or less follows the nature of the saturation curve shown in Fig. 5. Therefore, it will be seen that the present filter not only has a much higher efficiency starting from no engine load, but substantially reaches maximum efficiency at about 60% of engine load as against a filter which does not reach its maximum efficiency until maximum engine load is reached.

The improved efficiency of this cleaner is greater than one might ordinarily think by considering the efficiency curves in Figs. 6 and 7. The curve in Fig. 7 is that of a cleaner without a mask plate. Take, for example, the relative cleaning efficiencies at zero load. The improved cleaner allowed .4% of the dirt content to enter the engine, while the other cleaner passed 1.8%. Therefore, the cleaner of less efficiency passed four and a half times as much dirt as did the cleaner of the present invention. Therefore, while the actual percentage in figures does not immediately appear to be remarkably different, yet there is this remarkable difference when the actual relationship of the amount of material passed through the cleaner is considered. Improving the efficiency of the cleaner from such relatively high points of efficiency represents a real contribution to the art.

As to the broad range of oil levels which may be used, it may be pointed out that if the level is increased above the level A in Fig. 1, that much of this oil is isolated in the upper portion of the chamber 32. Therefore, a considerable increase in oil level will not cause the oil to pull over into the engine because of this isolation of a considerable percentage of the oil. In one filter which has been made and used, 32% of the oil was thus isolated, although, of course, this would vary with different dimensions. Also, the filter may be operated with an oil level below level A, the point being that the filtering medium extends down relatively close to the oil level, due to the frusto-conical formation, and even though the static oil level is relatively low the oil does not have to be lifted very high until it gets into the filter. If the oil reaches the lower portion of the filter which, in the form illustrated, happens to be adjacent the tube 3, the oil easily flows through the interstices of the filter and thence into the quiescent zone and back into the chamber 32. By having a filter which will operate over a large differential of oil levels, the filter will function properly even though a mechanic is careless in adjusting the oil level after cleaning or when the oil level is raised after long usage due to accumulated dirt.

To clean the filter the receptacle 15 is taken off and the cup and mask plate may then be removed and parts restored with a quantity of clean oil. Throughout this specification and in the claims the cleaning liquid is referred to as oil, as this is the usual liquid used, although it is to be understood that the invention is not limited to a liquid strictly known as oil, as this cleaner may be used with any suitable cleaning liquid, oil, or otherwise.

The mask plate positively prevents flow of air through the aperture 24 and up into the filtering medium in the space surrounding the cup 20. At high speeds air may tend to flow through this path, but is positively prevented from doing so. This is a factor in preventing pulling oil completely through the filtering medium at high speeds and over into the engine, since the only air and oil to enter the filtering medium is that flowing through the passageway 31.

I claim:

1. An air cleaner comprising a casing having an air inlet, a filtering medium and an air outlet, said casing including a receptacle for oil forming a closed connection between the inlet and the filtering medium; a cup in the receptacle into which the inlet opens, the walls of the cup being spaced from the walls of the receptacle and the inlet to define spaces inside the cup and outside and around the cup adjacent the filtering medium, said walls of the cup having apertures therein, the bottom of the cup having an aperture therein in substantial alignment with the air inlet, and a partition member bridging the space between the cup and the walls of the receptacle for dividing the receptacle into two main oil containing compartments.

2. An air cleaner comprising a casing having an air inlet, a filtering medium, an air outlet and a receptacle for oil forming a closed connection between the inlet and the filtering medium, said inlet extending into the receptacle, a cup in the receptacle the walls of which surround the air inlet in spaced relation thereto and defining an air flow passage, the walls of the cup being spaced from the walls the receptacle defining a chamber outside and around the cup, the walls of said cup having apertures therein forming a communication between the chamber and the interior of the cup, the bottom of the cup having an aperture therein in substantial alignment with the air inlet, and a partition located substantially at the bottom of the cup and extending from the cup to the side walls of the receptacle for dividing the receptacle into two oil compartments, one on each side of the partition connected at said aperture in the bottom of the cup.

3. An air cleaner comprising a casing having an air filtering medium therein, a receptacle for oil below the filtering medium, an inlet tube extending through the medium and opening into the receptacle, an outlet for air above the filtering medium, a cup in the receptacle into which the inlet tube opens, the walls of the cup being spaced from the inlet tube and the receptacle to define an air flow passageway inside the cup leading to the medium and a quiescent chamber outside and around the cup, the walls of the cup having apertures therein connecting the air flow passageway and the quiescent chamber, the bottom of the cup being spaced above the bottom of the receptacle and having an opening therein in substantial alignment with the inlet tube, and a partition extending substantially from the bottom of the cup to the side walls of the receptacle.

4. An air cleaner comprising a casing having an air filtering medium therein, a receptacle for oil below the filtering medium, an inlet tube extending through the medium and opening into the receptacle, an outlet for air above the filtering medium, a cup in the receptacle into which the inlet tube opens, the walls of the cup being spaced from the inlet tube and the receptacle to define an air flow passageway inside the cup leading to the medium and a quiescent chamber outside and around the cup, the walls of the cup having apertures therein connecting the air flow passageway and the quiescent chamber, the bottom of the cup being inclined away from the inlet tube toward the center of the cup and having an opening positioned in substantial alignment with the inlet tube, the bottom of the cup and opening being spaced above the bottom of the receptacle, and a partition extending substantially from the bottom of the cup to the side walls of the receptacle for dividing the receptacle into a lower and upper compartment for oil communicating with each other at said opening in the bottom of the cup.

5. An air cleaner comprising a shell including a receptacle in its lower portion for containing a quantity of oil, a filtering medium in the shell spaced above the static oil level, an air inlet tube extending through the shell and having its inner end disposed below the static level of the oil, an air outlet above the filtering medium, a cup in the receptacle having walls surrounding the lower end of the tube in spaced relation for defining an air passageway, the walls of the cup being spaced from the walls of the receptacle to define a quiescent chamber outside the cup which communicates with a portion of the filtering medium, the side walls of the cup having apertures therein connecting the quiescent chamber with the air flow passageway, the bottom of the cup being inclined downwardly toward its center and being spaced from the bottom of the receptacle, the bottom of the cup having an aperture therein in substantial alignment with the inlet tube, and a partition plate extending from the cup to the walls of the receptacle for dividing the oil therein into two bodies, one positioned below the partition and one positioned above the partition, with the body above the partition including the oil within the cup and the oil in the quiescent chamber.

6. An air cleaner comprising a casing having a filtering medium therein, an air inlet tube extending through the casing and filtering medium and opening at its lower end, an air outlet above the filtering medium, a receptacle at the lower end of the casing for containing a quantity of oil, a partition extending across the receptacle positioned above the bottom of the receptacle and below the lower end of the inlet tube for dividing the oil into upper and lower bodies, said partition having an opening in substantial alignment with the inlet tube forming a connection between the two bodies of oil, and means above the partition for dividing the space between the partition and the lower end of the filtering medium into an air passageway and into a quiescent zone, said quiescent zone being in communication with the filtering medium, said means having apertures therein positioned below the static oil level and connecting the quiescent chamber and air flow passageway.

7. An air cleaner comprising a casing, an air filtering element therein, a receptacle for containing a body of oil below the filtering medium with the static level normally spaced below the lower end of the filtering medium, an air inlet tube extending through the casing and opening into the receptacle, air outlet means above the filtering medium, means in the receptacle for dividing the oil into upper and lower oil bodies, said means lying above the bottom of the receptacle and having an opening in substantial alignment with the open end of the inlet tube, and means for dividing the portion of the receptacle above the partition into an air passageway leading from the inlet tube to the filtering medium and into a quiescent zone in communication with the filtering medium, said means having passageways for connecting the quiescent zone with the air passageway whereby to provide a circuitous flow path for the oil above the partition, to-wit, from the air passageway into the filtering medium, thence into the quiescent zone and back into the air passageway.

REX C. DARNELL.